US012797663B2

(12) United States Patent
Xu et al.

(10) Patent No.: US 12,797,663 B2
(45) Date of Patent: Nov. 17, 2026

(54) ZONE CONTROL VALVE AND FIRE-FIGHTING SYSTEM

(71) Applicant: ZEPHYR INTELLIGENT SYSTEM (SHANGHAI) co., LTD., Shanghai (CN)

(72) Inventors: Weizhong Xu, Shanghai (CN); Fei Li, Shanghai (CN); Liang Wang, Shanghai (CN); Junlei Cai, Shanghai (CN)

(73) Assignee: ZEPHYR INTELLIGENT SYSTEM (SHANGHAI) co., LTD., Shanghai (CN)

( * ) Notice: Subject to any disclaimer, the term of this patent is extended or adjusted under 35 U.S.C. 154(b) by 0 days.

(21) Appl. No.: 18/995,337

(22) PCT Filed: Aug. 18, 2023

(86) PCT No.: PCT/CN2023/113733
§ 371 (c)(1),
(2) Date: Jan. 16, 2025

(87) PCT Pub. No.: WO2024/152562
PCT Pub. Date: Jul. 25, 2024

(65) Prior Publication Data

US 2026/0027398 A1 Jan. 29, 2026

(30) Foreign Application Priority Data

Jan. 19, 2023 (CN) ......................... 202310060534.2

(51) Int. Cl.
*A62C 35/68* (2006.01)
*A62C 3/16* (2006.01)

(52) U.S. Cl.
CPC ................ *A62C 35/68* (2013.01); *A62C 3/16* (2013.01)

(58) Field of Classification Search
CPC ................................ F16K 17/40; F16K 17/403
See application file for complete search history.

(56) References Cited

U.S. PATENT DOCUMENTS 2,417,374 A * 3/1947 Morton ................ A62C 35/605 169/26
3,915,235 A * 10/1975 Hamilton .............. F16K 17/403 137/68.13

(Continued)

FOREIGN PATENT DOCUMENTS

CN 205278486 U * 6/2016
CN 105765282 A 7/2016

(Continued)

OTHER PUBLICATIONS

English translation of ISR/WO for PCT/CN2023/113733 mailed on Nov. 8, 2023.

*Primary Examiner* — Umashankar Venkatesan
(74) *Attorney, Agent, or Firm* — Rhodes IP PLC; Christopher R Rhodes

(57) ABSTRACT

Provided is a zone control valve and a fire-fighting system. The zone control valve comprises a valve body, a sealing diaphragm, and an electrical explosion driving device. A fluid flow path, comprising an inlet and an outlet, is formed inside the valve body, and the central axis of the inlet and the central axis of the outlet form an included angle; the sealing diaphragm is sealedly arranged in the fluid flow path and divides the fluid flow path into a first flow channel and a second flow channel; the electrical explosion driving device is mounted on the valve body, the output end of the electrical explosion driving device is in connection with a puncture part, and the puncture part is located in the second flow channel and directly faces the sealing diaphragm.

8 Claims, 4 Drawing Sheets

(56) References Cited

U.S. PATENT DOCUMENTS

| | | | | | |
|---|---|---|---|---|---|
| 4,003,395 | A | | 1/1977 | Tyler | |
| 4,046,156 | A | | 9/1977 | Cook | |
| 4,245,660 | A | * | 1/1981 | Rozniecki | F16K 13/06 251/80 |
| 4,476,937 | A | * | 10/1984 | Rozniecki | A62C 35/02 169/26 |
| 5,647,390 | A | * | 7/1997 | Wass | F16K 17/383 137/68.12 |
| 7,143,776 | B2 | * | 12/2006 | Sundholm | A62C 35/68 137/68.13 |
| 7,373,944 | B2 | * | 5/2008 | Smith | F16K 17/38 220/89.3 |
| 8,235,103 | B2 | * | 8/2012 | Wright | E21B 23/0412 166/330 |
| 9,970,561 | B2 | * | 5/2018 | Smith | F16K 31/002 |
| 10,527,183 | B1 | * | 1/2020 | Hill | F16K 13/06 |
| 2018/0341279 | A1 | | 11/2018 | John et al. | |

FOREIGN PATENT DOCUMENTS

| | | | |
|---|---|---|---|
| CN | 111946878 | A | 11/2020 |
| CN | 217463365 | A | 9/2022 |
| CN | 116085509 | A | 5/2023 |

* cited by examiner

ZONE CONTROL VALVE AND FIRE-FIGHTING SYSTEM

CROSS REFERENCE TO THE RELATED APPLICATION

This application claims the priority of Chinese Patent Application No. 202310060534.2, filed Jan. 19, 2023, which is hereby incorporated by reference in its entirety.

TECHNICAL FIELD

The present application relates to the technical field of a fire-fighting system, particularly to a zone control valve and a fire-fighting system.

BACKGROUND ART

The energy storage container mainly relies on an internally installed energy storage equipment system to store electric energy, and the generator set of the energy storage container has the advantages of being attractive in appearance, reasonable in structure and good in sealing performance, can work in a severe environment. It also has the advantages of being good in sound-proof effect, convenient to hoist and the like. The energy storage container can be applied to various scenarios such as electric power construction, medical emergencies, the petrochemical industry, mining and oilfields, hotels, vehicle-mounted applications, highways, railways, and other similar fields. In addition, the energy storage container may also be applied to a collection and storage of natural resources and electric energy, or a temporary power supply facility.

In the use of energy storage containers, fire safety is an important evaluation standard. In a fire-fighting system of an energy storage container, a zone valve is generally used as a separation valve of a protection partition by using an electromagnetic valve, and when the fire-fighting system is started, the electromagnetic valve needs to be opened and enables a pipeline of the fire-fighting system to be connected, so as to spray fire-fighting water. However, due to the fact that the space of the energy storage container is very compact, if the electromagnetic valve is malfunctioning, the electromagnetic valve is inconvenient to replace, and the space required for installation of the electromagnetic valve is relatively large, so that the space occupied by the battery in the energy storage container is occupied, which is not conducive to improving the energy density of the energy storage container; and meanwhile, the electromagnetic valve needs to be powered on for a long time, which is relatively high in cost.

SUMMARY

The present application provides a zone control valve, which features a simple and compact design, occupies a small space, facilitates easy replacement and maintenance, and boasts quick response times when activation is required.

The zone control valve comprises a valve body, a sealing diaphragm and an electric explosion driving device, wherein a fluid flow path is formed in the valve body, the fluid flow path is provided with an inlet and an outlet, and the central axis of the inlet and the central axis of the outlet are arranged at an included angle; the sealing diaphragm is hermetically disposed on the fluid flow path, and divides the fluid flow path into a first flow channel and a second flow channel; the electric explosion driving device is installed on the valve body, an output end of the electric explosion driving device is in connection with a puncture part, and the puncture part is located in the second flow channel and is arranged right opposite to the sealing diaphragm; wherein the electric explosion driving device can be electrically connected with an external control unit, and the external control unit can send a starting signal to enable the electric explosion driving device to activate and drive the puncture part to approach and pierce the sealing diaphragm.

This application provides a fire-fighting system, where the fire-fighting system comprises the above-mentioned zone control valve.

REFERENCE NUMERALS

100—Valve body; 101—External tooth connector; 102—Elbow connector; 103—Inlet; 104—Outlet; 105—Mounting hole; 110—First flow channel; 111—Limiting part; 120—Second flow channel; 200—Sealing diaphragm; 210—Sealing gasket; 220—fixing part; 230—Fixing washer; 300—Electric explosion cylinder; 301—Through hole; 302—Mounting inner cavity; 303—Limiting step; 310—Wire; 3101—Plug connector; 321—Igniter; 322—Expansion agent; 330—Elastic part; 31—Puncture part; 311—Sliding portion; 3111—Mounting groove; 312—Puncture portion; 3121—Liquid discharge hole;

400—External control unit.

DETAILED DESCRIPTION

The present disclosure will be described below with reference to the accompanying drawings and embodiments. The specific embodiments described herein are merely used to explain the present disclosure. For ease of description, only a part related to this application is shown in the accompanying drawings.

In the description of the present application, unless otherwise specified and defined, the terms “connected”, “connected” and “fixed” should be understood in a broad sense, for example, may be a fixed connection, a detachable connection, or a whole; may be a mechanical connection, or may be an electrical connection; or may be a direct connection, or may be indirectly connected by using an intermediate medium, and may be an interaction relationship between communication in two elements or two elements. For those of ordinary skill in the art, the meanings of the above terms in the present disclosure may be understood according to situations.

In this application, unless otherwise specified and limited, the first feature “on” or “under” the second feature may comprise direct contact between the first feature and the second feature, or may comprise that the first feature and the second feature are not in direct contact but are in contact through another feature between the first feature and the second feature. Moreover, the first feature “above”, “above”

and "above" the second feature comprises that the first feature is directly above and obliquely above the second feature, or merely indicates that the horizontal height of the first feature is higher than that of the second feature. The first feature "below", "below" and "below" the second feature comprises that the first feature is directly below and obliquely below the second feature, or merely indicates that the horizontal height of the first feature is less than the second feature.

In the description of this embodiment, the terms "upper", "lower", "right", and the like are used to facilitate description and simplify operations, rather than to indicate or imply that the device or element referred to has to have a specific orientation, which is constructed and operated in a specific orientation, and therefore cannot be understood as a limitation to the present application. In addition, the terms "first" and "second" are merely used to distinguish between descriptions, and do not have a special meaning.

Figure 1:
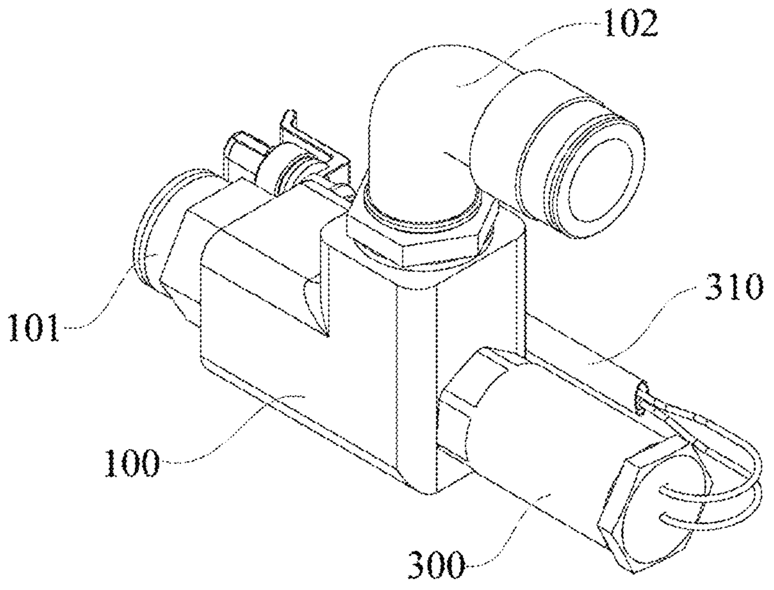
FIG. 1 is an isometric view of a zone control valve according to an embodiment of this application.
Figure 2:
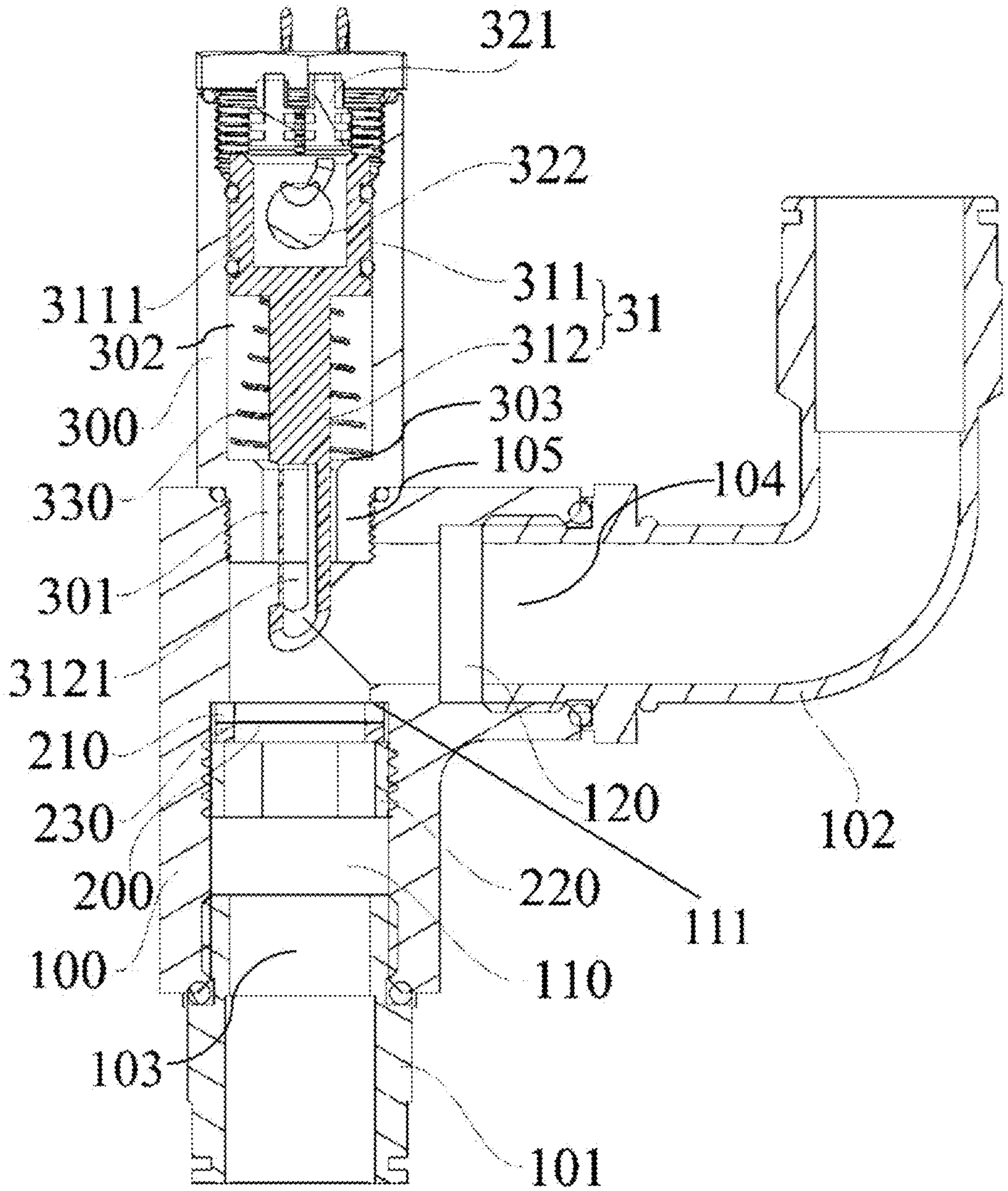
FIG. 2 is a cross-sectional view of a zone control valve according to an embodiment of this application.
Figure 4:
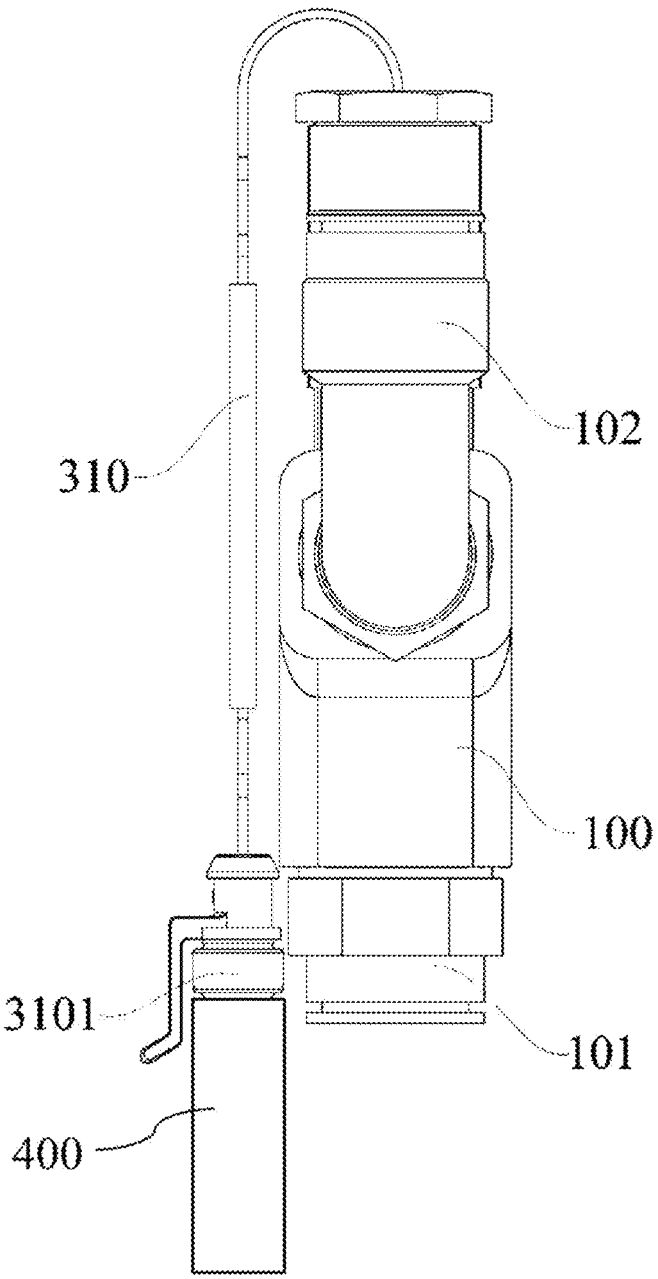
FIG. 4 is a side view of another zone control valve according to an embodiment of this application.

Referring to FIGS. 1-2 and 4, in this embodiment, the zone control valve comprises a valve body 100, a sealing diaphragm 200 and an electric explosion driving device, a fluid flow path is formed inside the valve body 100, the fluid flow path has an inlet 103 and an outlet 104, and the central axis of the inlet 103 and the central axis of the outlet 104 are arranged at an included angle. The sealing diaphragm 200 is hermetically disposed on the fluid flow path, and divides the fluid flow path into a first flow channel 110 and a second flow channel 120. The electric explosion driving device is mounted on the valve body 100, the output end of the electric explosion driving device is in connection with a puncture part 31, and the puncture part 31 is located in the second flow channel 120 and is arranged right opposite to the sealing diaphragm 200; wherein the electric explosion driving device can be electrically connected with the external control unit 400, and the external control unit 400 can send a starting signal to enable the electric explosion driving device to activate and drive the puncture part 31 to be close to and pierce the sealing diaphragm 200

In this embodiment, the fluid flow path of the valve body 100 is divided into the first flow channel 110 and the second flow channel 120 through the sealing diaphragm 200, an electric explosion driving device is further arranged on the valve body 100, the output end of the electric explosion driving device is in connection with the puncture part 31. When the electric explosion driving device receives the starting signal from the external control unit 400, the electric explosion driving device ignites and outbreaks to drive puncture part 31 to penetrates through the sealing diaphragm 200 from the second flow channel 120, so that the first flow channel 110 communicates with the second flow channel 120, and the communication of the fluid flow path and the opening of the zone control valve are realized. The zone control valve in this embodiment is simple and compact in structure, the zone control valve can be opened only by using the electric explosion driving device to drive the puncture part 31 to break down the sealing diaphragm. The response time is short, the manufacturing cost is low, and when the zone control valve is applied to the fire-fighting system of the energy storage battery box, the space occupied by the zone control valve can be reduced, thereby improving the energy density of the energy storage battery box.

Referring to FIG. 2, a limiting portion 111 is disposed in the first flow channel 110, a sealing gasket 210 and a fixing part 220 are further inserted into the first flow channel 110, the sealing gasket 210 abuts against the limiting portion 111, the fixing part 220 is detachably connected to the inner wall of the first flow channel 110, and the sealing diaphragm 200 is sandwiched between the fixing part 220 and the sealing gasket 210. The inner wall of the first flow channel 110 is provided with an internal thread, the peripheral wall surface of the fixing part 220 is provided with an external thread, and the fixing part 220 is in threaded connection with the inner wall of the first flow channel 110. In this way, the sealing diaphragm 200 can be firmly clamped on the limiting part 111 by the fixing part 220, and when the sealing diaphragm 200 needs to be replaced, only the fixing part 220 needs to be detached to re-install a new sealing diaphragm 200. The sealing gasket 210, composed of four fluororubber components, exhibits excellent elasticity and sealing capabilities, demonstrates robust corrosion resistance, and effectively guarantees that the sealing diaphragm 200 fully seals and isolates the first flow channel 110 from the second flow channel 120.

In an embodiment, the fixing washer 230 is further sandwiched between the sealing diaphragm 200 and the fixing part 220, and the fixing washer 230 can protect the sealing diaphragm 200 from being squeezed and damaged by the fixing part 220, improve the installation stability of the sealing diaphragm 200, prolong the service life of the sealing diaphragm 200, and ensure that the control valve has good use reliability.

The structure of the electric explosion driving device is described below with reference to FIG. 2. In this embodiment, the valve body 100 is provided with a mounting hole 105, the electric explosion driving device is threadedly connected to the mounting hole 105, the mounting hole 105 directly faces the sealing diaphragm 200 and is coaxially arranged with the first flow channel 110, and the puncture part 31 is also located on the centerline of the first flow channel 110, so that the electric explosion driving device can drive the puncture part 31 to pierce the sealing diaphragm 200 in the central axis direction of the first flow channel 110, the stroke of the electric explosion driving device is the shortest, and the response time of the zone control valve can be shortened.

The electric explosion driving device comprises an electric explosion cylinder 300 in threaded connection with the mounting hole 105. The electric explosion cylinder 300 is provided with a mounting inner cavity 302. the end, close to the mounting hole 105, of the electric explosion cylinder 300 is provided with a through hole 301 for the puncture part 31 to pass through, the other end, away from the mounting hole 105, of the electric explosion cylinder 300 is provided with an external thread connected with the mounting hole 105 in a matched mode. When the electric explosion triggering mechanism is started, the puncture part 31 can be driven to penetrate through the through hole 301 and pierce the sealing diaphragm 200, so that the arranged electric explosion driving device is simple in structure and more compact in axial direction, and the space occupied by the zone control valve can be reduced.

Still referring to FIG. 2, the mounting inner cavity 302 has a limiting step 303, the puncture part 31 comprises a sliding portion 311 and a puncture portion 312 connected to each other, the sliding portion 311 is slidably connected to the mounting inner cavity 302, the puncture portion 312 passes through the through hole 301, and the bottom wall of the sliding portion 311 is elastically connected to the limiting step 303. The puncture portion 312 is sleeved with an elastic part 330, such as a spring, which is not limited in this embodiment, and one end of the elastic part 330 abuts against the lower wall of the sliding portion 311, and the other end abuts against the limiting step 303. At the same time, after puncturing the sealing diaphragm 200, the elastic part 330 can return the puncture part 31 to reset, thereby ensuring that the breaking opening on the sealing diaphragm 200 is in an open state, and ensuring smooth flow between the first flow channel 110 and the second flow channel 120.

In an embodiment, the electric explosion triggering structure comprises an igniter 321 and an expansion agent 322, the top of the sliding portion 311 is provided with a mounting groove 3111, and the expansion agent 322 is placed in the mounting groove 3111. When the igniter 321 is started, the expansion agent 322 can be ignited, and the high-pressure gas generated by the explosion of the expansion agent 322 pushes the puncture part 31 towards the sealing diaphragm 200, so as to pierce the sealing diaphragm 200. The mounting groove 3111 is formed in the top of the sliding portion 311 to accommodate the expansion agent 322, so that the axial length of the electric explosion driving device can be shortened, thereby reducing the volume of the zone control valve.

In an embodiment, the puncture portion 312 is provided with a blind hole, and the peripheral wall surface of the puncture portion 312 is provided with a puncture portion 312 communicated with the blind hole. After the puncture portion 312 pierces the sealing diaphragm 200, the liquid discharge hole 3121 serves as both a liquid discharge point and a flow guide, so that it is ensured that the first flow channel 110 and the second flow channel 120 are switched on in a very short time, and the response time is shortened.

Figure 3:
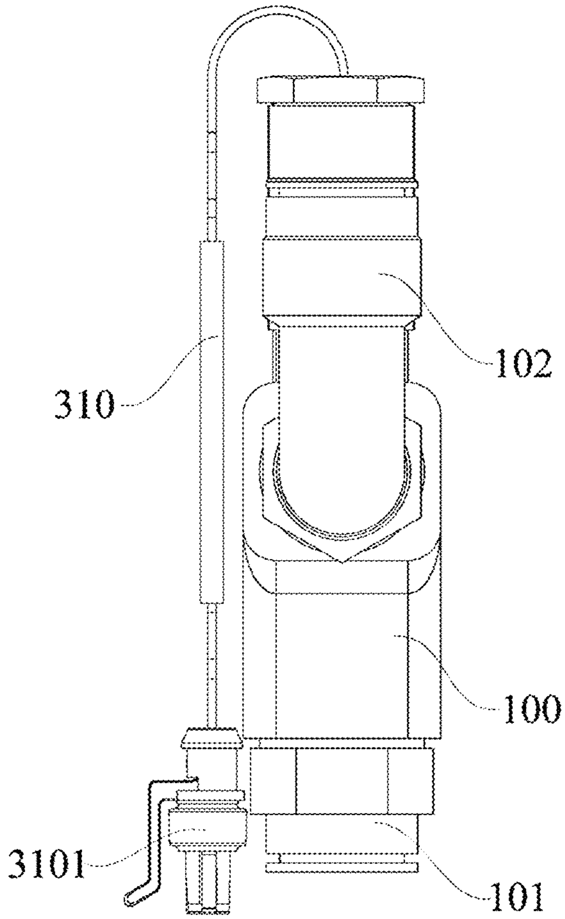
FIG. 3 is a side view of a zone control valve according to an embodiment of this application.

As shown in FIG. 1 and FIG. 3, the zone control valve in this embodiment further comprises an external tooth connector 101 in communication with the first flow channel 110 and an elbow connector 102 in communication with the second flow channel 120, wherein the external tooth connector 101 and the elbow connector 102 are configured to connect the zone control valve to the pipeline, and certainly, other types of connectors may also be selected, which is not limited in this embodiment.

As shown in FIG. 3 and FIG. 4, the zone control valve in this embodiment further comprises a wire 310 and a plug connector 3101. One end of the wire 310 is connected with the electric explosion driving device, the other end of the wire 310 is connected with the plug connector 3101, and the plug connector 3101 is inserted into the control unit 400 outside. The control signal sent by the external control unit 400 is connected to the electric explosion driving device, thereby initiating the electric explosion driving device.

This embodiment further provides a fire-fighting system, which comprises the zone control valve according to any one of the above solutions. The fire-fighting system using the zone control valve can be started quickly, the occupied space is reduced, the cost is also reduced, and when the fire-fighting system is applied to the energy storage container, the energy density of the energy storage container can be improved.

The invention claimed is:

1. A zone control valve, comprising:

a valve body, wherein a fluid flow path is formed inside the valve body, the fluid flow path has an inlet and an outlet, and a central axis of the inlet and a central axis of the outlet are arranged at an included angle;

a sealing diaphragm, wherein the sealing diaphragm is hermetically arranged on the fluid flow path, and divides the fluid flow path into a first flow channel and a second flow channel;

an electric explosion driving device, wherein the electric explosion driving device is mounted on the valve body, an output end of the electric explosion driving device is connected with a puncture part in a driving manner, and the puncture part is located in the second flow channel and is arranged right opposite to the sealing diaphragm;

the electric explosion driving device is electrically connected to an external control unit, and the external control unit is configured to emit a starting signal, so that the electric explosion driving device ignites and outbreaks to drive the puncture part to approach and pierce the sealing diaphragm;

wherein the valve body is provided with a mounting hole, and the electric explosion driving device is threadedly connected to the mounting hole; and wherein the electric explosion driving device comprises an electric explosion cylinder in threaded connection with the mounting hole, the electric explosion cylinder is provided with a mounting inner cavity; one end, close to the mounting hole, of the electric explosion cylinder is provided with a through hole through which the puncture part passes, the other end, away from the mounting hole, of the electric explosion cylinder is provided with an electric explosion triggering structure; the mounting inner cavity is slidably connected with the puncture part, and the electric explosion triggering structure is configured to drive the puncture part to be close to the sealing diaphragm when the electric explosion triggering structure is started.

2. The zone control valve according to claim 1, wherein a limiting portion is provided in the first flow channel, the first flow channel is further provided with a sealing gasket and a fixing part that are inserted inside it, the sealing gasket abuts against the limiting portion, the fixing part is detachably connected to an inner wall of the first flow channel, and the sealing diaphragm is sandwiched between the fixing part and the sealing gasket.

3. The zone control valve according to claim 2, wherein a fixing washer is further sandwiched between the sealing diaphragm and the fixing part.

4. The zone control valve according to claim 2, wherein the fixing part is threadedly connected to an inner wall of the first flow channel.

5. The zone control valve according to claim 1, wherein the mounting inner cavity is provided with a limiting step, the puncture part comprises a sliding portion and a puncture portion connected to each other, the sliding portion is slidably connected to the mounting inner cavity, the puncture portion passes through the through hole, and a bottom wall of the sliding portion is elastically connected to the limiting step.

6. The zone control valve according to claim 5, wherein the electric explosion triggering structure comprises an igniter and an expansion agent, the top of the sliding portion is provided with a mounting groove, and the expansion agent is placed in the mounting groove.

7. The zone control valve according to claim 5, wherein the puncture portion is provided with a blind hole, and the peripheral wall surface of the puncture portion is provided with a liquid discharge hole in communication with the blind hole.

8. A fire-fighting system, comprising the zone control valve according to claim 1.

* * * * *